United States Patent
Fu et al.

(10) Patent No.: US 9,247,315 B2
(45) Date of Patent: Jan. 26, 2016

(54) DISABLING OF MULTIPLE BITRATE ALGORITHM FOR MEDIA PROGRAMS WHILE PLAYING ADVERTISEMENTS

(71) Applicant: HULU, LLC, Santa Monica, CA (US)

(72) Inventors: Deliang Fu, Beijing (CN); Haisheng Wu, Beijing (CN); Binbin Yu, Beijing (CN); Zhibing Wang, Beijing (CN); Xin Jin, Beijing (CN); Baptiste Coudurier, Los Angeles, CA (US)

(73) Assignee: HULU, INC., Santa Monica, CA (US)

( * ) Notice: Subject to any disclaimer, the term of this patent is extended or adjusted under 35 U.S.C. 154(b) by 0 days.

(21) Appl. No.: 14/533,772

(22) Filed: Nov. 5, 2014

(65) Prior Publication Data

US 2015/0128170 A1    May 7, 2015

Related U.S. Application Data

(60) Provisional application No. 61/903,143, filed on Nov. 12, 2013.

(51) Int. Cl.
| | |
|---|---|
| *H04N 7/10* | (2006.01) |
| *H04N 7/025* | (2006.01) |
| *H04N 21/81* | (2011.01) |
| *G06Q 30/02* | (2012.01) |
| *H04N 21/2662* | (2011.01) |
| *H04N 21/462* | (2011.01) |
| *H04N 21/2343* | (2011.01) |
| *H04N 21/24* | (2011.01) |
| *H04N 21/845* | (2011.01) |
| *H04L 12/26* | (2006.01) |

(52) U.S. Cl.
CPC ......... *H04N 21/812* (2013.01); *G06Q 30/0251* (2013.01); *H04L 43/0882* (2013.01); *H04N 21/23439* (2013.01); *H04N 21/2402* (2013.01); *H04N 21/2662* (2013.01); *H04N 21/4621* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 6,101,195 | A * | 8/2000 | Lyons et al. | 370/498 |
| 6,490,320 | B1 * | 12/2002 | Vetro et al. | 375/240.08 |
| 7,068,724 | B1 * | 6/2006 | Hamilton | 375/240.26 |
| 2006/0126713 | A1 * | 6/2006 | Chou et al. | 375/225 |
| 2006/0203919 | A1 * | 9/2006 | Hamilton | 375/240.26 |
| 2007/0064739 | A1 * | 3/2007 | Krishnamachari | 370/486 |
| 2009/0307368 | A1 * | 12/2009 | Sriram et al. | 709/231 |
| 2011/0283015 | A1 * | 11/2011 | Melnyk et al. | 709/233 |
| 2011/0296458 | A1 * | 12/2011 | Di Mattia et al. | 725/36 |
| 2014/0150046 | A1 * | 5/2014 | Epstein et al. | 725/126 |

* cited by examiner

*Primary Examiner* — Nathan Flynn
*Assistant Examiner* — William J Kim
(74) *Attorney, Agent, or Firm* — Brian N. Young; Fountainhead Law Group PC

(57) ABSTRACT

In one embodiment, a method determines first information from a component of a computing device to determine when receiving of one or more advertisements will affect an available bandwidth reading that is based on receiving of a media program. Then, the method dynamically disables a multiple bitrate algorithm based upon the first information such that a new bitrate version of the media program cannot be requested by the multiple bitrate algorithm for the media player. Second information is determined from the component of the computing device to determine when the available bandwidth reading will not be affected by receiving of the one or more advertisements. The method then dynamically enables the multiple bitrate algorithm based on the second information. The multiple bitrate algorithm is then allowed to request the different bitrate version of the media program based on the available bandwidth reading.

20 Claims, 9 Drawing Sheets

DISABLING OF MULTIPLE BITRATE ALGORITHM FOR MEDIA PROGRAMS WHILE PLAYING ADVERTISEMENTS

CROSS REFERENCES TO RELATED APPLICATIONS

This application claims the benefit of U.S. Provisional Patent Application No. 61/903,143, filed Nov. 12, 2013 and entitled "DISABLING OF MULTIPLE BITRATE ALGORITHM FOR CONTENT WHILE PLAYING ADVERTISEMENTS", which is incorporated by reference in its entirety for all purposes.

BACKGROUND

Multiple bitrate streaming involves allowing a client to adaptively request different versions of a media program encoded at multiple bitrates. For example, a client can select which version of a media program to request based on the available bandwidth or download speed. When the client determines that the available bandwidth is greater than the bitrate of the current version of the media program being downloaded, the client can request a higher bitrate version of the media program. In contrast, when the client determines that the available bandwidth is lower than the current bitrate of the current version of the media program being downloaded, the client can request a lower bitrate version of the media program.

When available bandwidth goes down, the playback of the media program may be adversely affected because less video content for the media program is received and may cause the playback to be jittery. To compensate for the reduced amount of bandwidth, the client can switch to the lower bitrate version of the media program. This compensates for the lower amount of available bandwidth because the lower bitrate version of the media program allows the client to download more of the media program than if a higher bitrate was used. However, the quality of the playback of the media program will be affected, which may adversely affect the viewing experience as lower resolution video is being played. Thus, unnecessarily switching to a lower bitrate version of the media program is undesirable.

SUMMARY

In one embodiment, a method determines first information from a set of components of a computing device to determine when receiving of one or more advertisements will affect an available bandwidth reading that is based on receiving of a media program. The one or more advertisements are received during an advertisement break of the media program that is being played by a media player. Then, the method dynamically disables a multiple bitrate algorithm based upon the first information such that a new bitrate version of the media program cannot be requested by the multiple bitrate algorithm for the media player. The multiple bitrate algorithm determines when to request a different bitrate version of the media program based on the available bandwidth reading. Second information is determined from the set of components of the computing device to determine when the available bandwidth reading will not be affected by receiving of the one or more advertisements. The method then dynamically enables the multiple bitrate algorithm based on the second information. The multiple bitrate algorithm is then allowed to request the different bitrate version of the media program based on the available bandwidth reading.

In one embodiment, a non-transitory computer-readable storage medium contains instructions, that when executed, control a computer system to be configured for: determining first information from a component of a computing device to determine when receiving of one or more advertisements will affect an available bandwidth reading that is based on receiving of a media program, wherein one or more advertisements are received during an advertisement break of the media program that is being played by a media player; dynamically disabling a multiple bitrate algorithm based upon the first information such that a new bitrate version of the media program cannot be requested by the multiple bitrate algorithm for the media player, the multiple bitrate algorithm determining when to request a different bitrate version of the media program based on the available bandwidth reading; determining second information from the component of the computing device to determine when the available bandwidth reading will not be affected by receiving of the one or more advertisements; and dynamically enabling the multiple bitrate algorithm based on the second information, wherein the multiple bitrate algorithm is allowed to request the different bitrate version of the media program based on the available bandwidth reading.

In one embodiment, an apparatus includes: one or more computer processors; and a non-transitory computer-readable storage medium comprising instructions, that when executed, control the one or more computer processors to be configured for: determining first information from a component of a computing device to determine when receiving of one or more advertisements will affect an available bandwidth reading that is based on receiving of a media program, wherein one or more advertisements are received during an advertisement break of the media program that is being played by a media player; dynamically disabling a multiple bitrate algorithm based upon the first information such that a new bitrate version of the media program cannot be requested by the multiple bitrate algorithm for the media player, the multiple bitrate algorithm determining when to request a different bitrate version of the media program based on the available bandwidth reading; determining second information from the component of the computing device to determine when the available bandwidth reading will not be affected by receiving of the one or more advertisements; and dynamically enabling the multiple bitrate algorithm based on the second information, wherein the multiple bitrate algorithm is allowed to request the different bitrate version of the media program based on the available bandwidth reading.

The following detailed description and accompanying drawings provide a better understanding of the nature and advantages of particular embodiments.

DETAILED DESCRIPTION

Described herein are techniques for a multiple bitrate switching system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
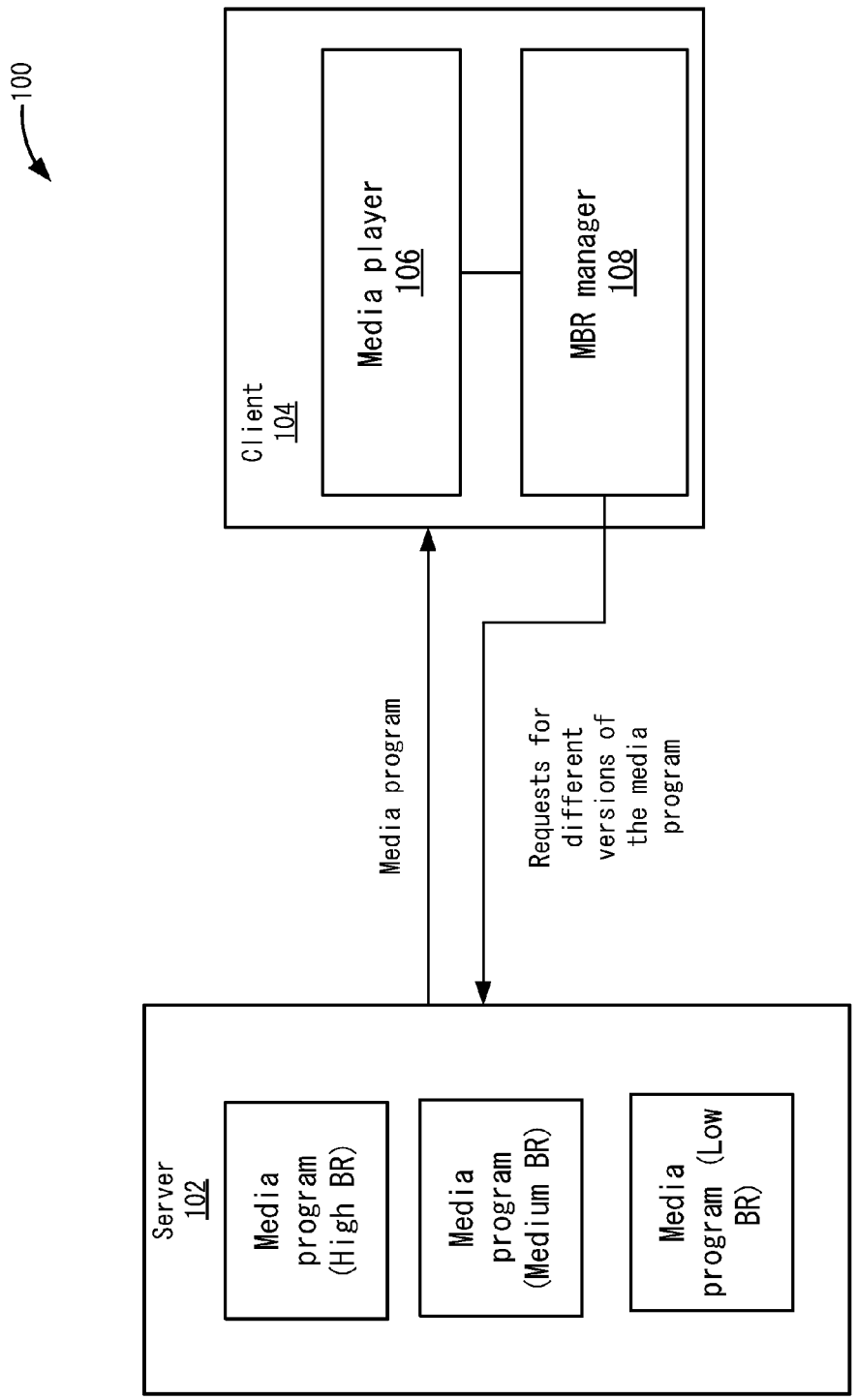
FIG. 1 depicts a system for dynamically adjusting (e.g., turning on and off) a multiple bitrate (MBR) switching algorithm according to one embodiment.

FIG. 1 depicts a system 100 for dynamically adjusting (e.g., turning on and off) a multiple bitrate (MBR) switching algorithm according to one embodiment. System 100 includes a server 102 and a client 104. Although one instance of server 102 and client 104 are shown, multiple instances of server 102 and client 104 may be used.

Server 102 may deliver media programs to client 104. In one example, server 102 includes various media programs, such as videos (e.g., a title, movie, or show) or audio that have been (or will be) encoded in different versions at different bitrates. For example, a media program has been divided into segments that an encoder encodes at multiple bitrates, from high to low. As shown, a media program is stored in different versions (i.e., bitrates) as a first version of the media program (e.g., high bitrate), a second version of the media program (e.g., medium bitrate), . . . , and an N version of the media program (e.g., low bitrate). The different bitrates provide video content at different levels of quality. For example, a higher bitrate video will be of a higher quality (e.g., resolution) than the medium bitrate, and the medium bitrate of a higher quality than the lower bitrate. Although these encodings are described, various embodiments may include different encodings at any number of bitrates.

Client 104 may include various user devices, such as cellular phones, set top boxes, personal computers, tablet computers, etc. Client 104 may include a media player 106 that can play the content. For example, media player 106 may play videos or audio.

Client 104 can receive media programs from server 102. For example, client 104 (e.g., media player 106) may request segments of the media program from server 102. While receiving the segments of media program, client 104 can evaluate the available bandwidth experienced while receiving the media program. One evaluation client 104 may perform is measure the amount of video content received over a period of time to estimate the available bandwidth. Depending on the available bandwidth, client 104 may make decisions on which bitrate (or version) of the media program to request. For example, an MBR manager 108 determines which version of the media program to request.

MBR manager 108 may use an MBR algorithm to determine when to switch to a different version of the media program. The MBR algorithm analyzes the available bandwidth and possibly other factors (e.g., computer processing unit load) to determine when to switch to a different version. For example, if the MBR algorithm determines that the available bitrate is 2 Mbps and client 104 is requesting the media program version at a bitrate of 1 Mbps, the MBR algorithm may determine that client 104 should request the media program version encoded at 2 Mbps.

MBR manager 108 may manage when the multiple bitrate algorithm is active while a media program is being played. For example, MBR manager 108 may determine whether to disable the multiple bitrate algorithm when advertisement breaks are encountered. During the playing of the media program, advertisement breaks may be encountered where playing of the media program is stopped and advertisements are received and played. In some cases, when client 104 receives an advertisement, client 104 may calculate the available bandwidth for the media program, which may not accurately represent the available bandwidth. This may cause the MBR algorithm to switch to a lower bitrate version for the media program. Thus, client 104 receives lower bitrate video content for the media program while the advertisements are received and played. Also, when the advertisement break finishes, switching to the lower bitrate version of the media program may cause server 102 to continue to send lower quality version of the media program to media player 106 until the MBR algorithm can switch to a higher bitrate version of the media program, which may take some time. The switching to the lower bitrate version may not have been necessary, however, because, in actuality, the available bandwidth may have been sufficient to accommodate the higher bitrate version of the media program throughout the playing of the advertisements.

The available bandwidth may be calculated by a media player application programming interface (API) that is configured to measure the amount of video content downloaded over a period of time as the available bandwidth irrespective of whether an advertisement is being downloaded also. This may provide an inaccurate reading of available bandwidth because less video content for the media program is downloaded while an advertisement is also being downloaded. To counteract switching during the playing of an advertisement, particular embodiments determine whether to disable the MBR algorithm during the receiving of the advertisement to limit the ability for the MBR algorithm to switch to a lower bitrate version of the media program. For example, when client 104 receives an advertisement for playing during an advertisement break in the media program, MBR manager 108 may determine the advertisement is being received and disable or turn off the multiple bitrate algorithm. Also, MBR manager 108 may evaluate other factors, such as content buffer length, to determine whether to disable (or adjust) the multiple bitrate algorithm.

Figure 2A:
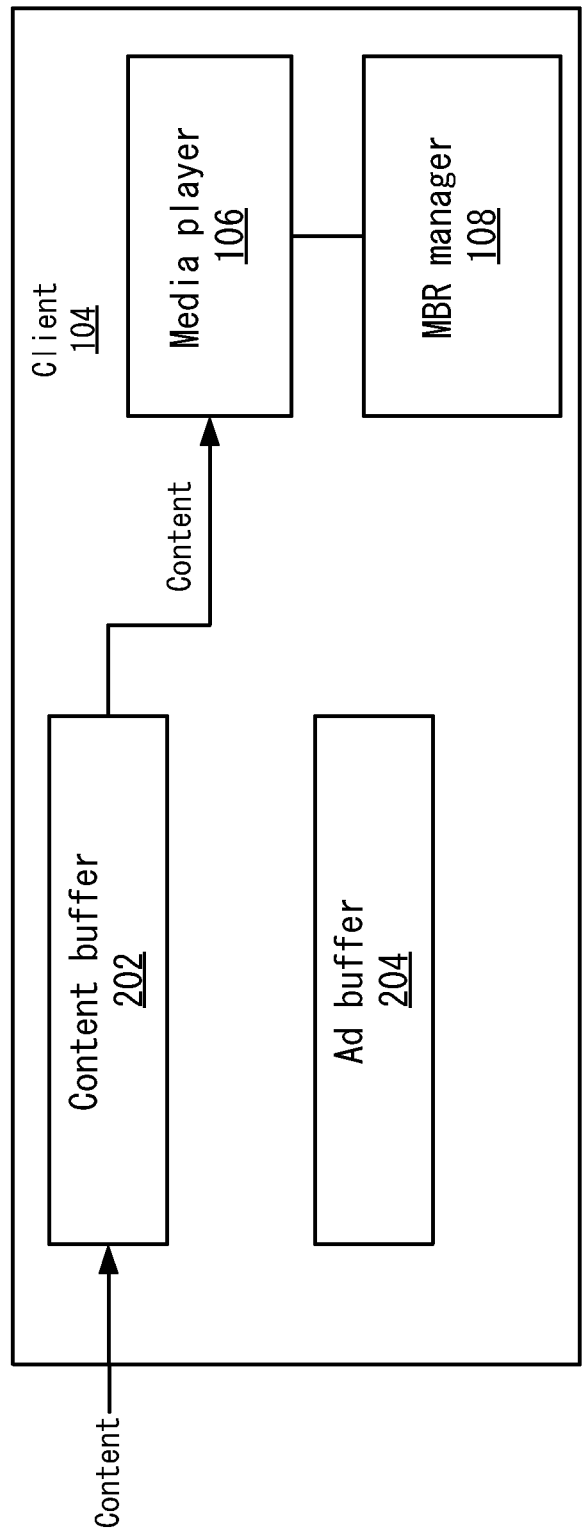
FIGS. 2A and 2B describe the use of buffers in playing content and advertisements according to one embodiment.
Figure 2B:
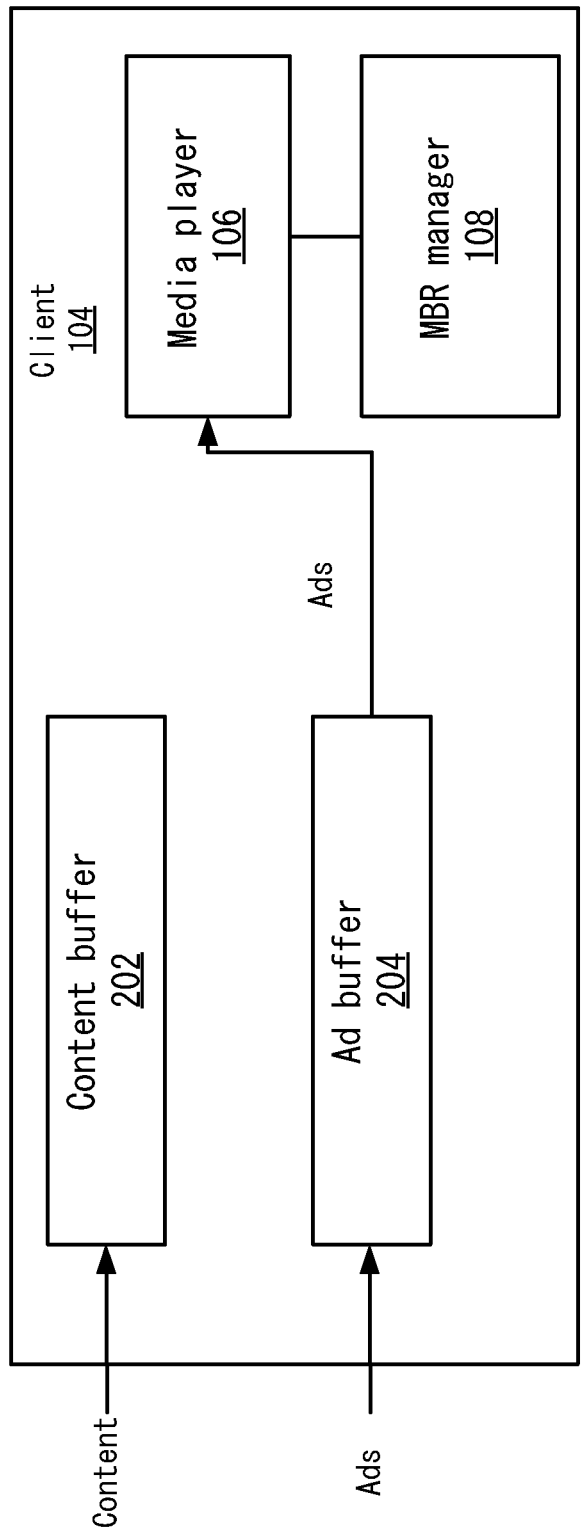

The following will now describe the receiving of the media program and the advertisements in more detail. FIGS. 2A and 2B describe buffers that are used to buffer video content for the media program and the advertisements (which are also video content but are referred to as advertisements for discussion purposes) according to one embodiment. In FIG. 2A, in operation, client 104 uses a content buffer 202 and an advertisement (ad) buffer 204 to buffer content and advertisements, respectively. Although separate buffers are described, integrated buffers may also be used. When video content is received for a media program, content buffer 202 stores the video content. Then, media player 106 reads the video content out of content buffer 202 when playing the video content. Also, when advertisements are received, advertisement buffer 204 stores the advertisements. During an advertisement break, media player 106 reads the advertisements out of advertisement buffer 204 to play the advertisement.

In the process depicted in FIG. 2A, client 104 is not receiving an advertisement. In this case, an advertisement break may not have been encountered in the media program. That is, advertisements may only be received when an advertisement break is encountered in the media program. In some cases, the advertisements may be received prior to the advertisement break beginning in the media program and stored in advertisement buffer 204. For example, client 104 may receive an advertisement slightly before an advertisement break occurs in the media program. However, in the process shown in FIG. 2, advertisements are not being received at the moment. Rather, content buffer 202 receives video content for the media program from server 102, and stores the video content. Then, media player 106 reads the video content out of content buffer 202 and plays the video content.

FIG. 2B indicates a time in which clients 104 receive advertisements. For example, this may be during an advertisement break. Also, the advertisements may be received prior to an advertisement break, such as slightly before the advertisement break is encountered. In either case, advertisement buffer 204 receives and stores the advertisements. When the advertisement break occurs, media player 106 reads the advertisements out of advertisement buffer 204 and plays the advertisements. Also, at this time, media player 106 is not reading any video content from content buffer 202.

Content buffer 202 may also be receiving video content for the media program while advertisement buffer 204 receives the advertisements (in other examples, no video content for the media program is received). Thus, client 104 is receiving a reduced amount of video content for the media program because both the media program and advertisements are received during this time. In other embodiments, client 104 may not be receiving a reduced amount of video content for the media program. But, there are still chances for inaccuracies in reading the correct bandwidth for different reasons. For example, client 104 could be receiving the same amount of video content just because the content buffer is full. As the result, the amount of video content is the same as before (e.g., no content received). In this case, disabling MBR when playing ads is still necessary since the inaccurate bandwidth reading may affect later multiple bitrate decisions.

In one embodiment, the media player API measures the available bandwidth based on only the video content for the media program received, and not the advertisements. This measurement may not take into account that client 104 is also receiving the advertisements, which use some of the available bandwidth. The advertisements and video content for the media program may be stored at different server or content delivery networks (CDNs), so the download speed for them may be different and it would be hard to determine an accurate available bandwidth reading using both of them. Also, in some implementations, the playback of advertisements and video content for the media program are conducted by different media players and the combining the available bandwidth reading for both players is difficult. For some other platforms, counting the total speed of two simultaneous streams for the advertisements and the video content for the media program would increase the complexity of the media player and make the maintenance harder.

Even though client 104 receives the advertisements, client 104 may also still receive the video content (although possibly a reduced amount) for the media program. Thus, the amount of video content for the media program received while client 104 receives an advertisement may be less than the amount of video content client 104 receives when client 104 receives no advertisements.

In one embodiment, the media player API calculates the available bandwidth to be less when advertisements are being received due to the amount of video content for the media program being received being less over a period of time. For example, over a set period of time, such as 5 seconds, more video content is received when client 104 receives no advertisements than when client 104 is receiving some advertisements. If the MBR algorithm for the content is operating during the time at which client 104 receives both video content for the media program and advertisements, the MBR algorithm may decide that the available bandwidth is low and switch to receiving a lower bitrate version of the media program while client 104 is receiving the advertisements. This stores lower bitrate video content in content buffer 202. When the advertisement break ends, media player 106 reads the lower bitrate video content from content buffer 202 and plays the video content.

The switching to a lower bitrate version of the media program may be performed during the advertisement break. However, when client 104 stops receiving the advertisements, the available bandwidth to receive the media program goes up. But, client 104 is currently requesting a lower bitrate version of the media program. Thus, during this time, the MBR algorithm is not maximizing the available bandwidth and client 104 could be receiving higher quality video content based on the available bandwidth. The MBR algorithm could switch to a higher bitrate version upon detecting that the available bandwidth is greater when client 104 is not receiving any advertisements. However, the switch may be delayed because the MBR algorithm may take time to switch because some higher readings of available bandwidth are needed for the MBR algorithm to switch. Further, due to the switch to the lower bitrate version of the media program during the receiving of the advertisements, content buffer 202 includes some lower bitrate video content that client 104 will play before a switch to the higher quality version of the media program can be made to store higher quality video content for the media program in content buffer 202.

To further exacerbate the situation, the advertisements may be sent at a different bitrate than the current bitrate version of the media program being requested. For example, a higher bitrate advertisement may be sent than the current bitrate version of the media program. This advertisement thus uses more available bandwidth than the current bitrate version of the media program. In one example, there may not be a choice of different bitrates of advertisements and only one version of the advertisement may be sent. The higher bitrate version of the advertisement further reduces the available bandwidth for receiving the video content for the media program. This may cause MBR manager 108 to switch to an even lower bitrate version of the media program, such as the lowest bitrate version possible.

To improve the functioning of client 104, in one embodiment, MBR manager 108 may turn off the MBR algorithm based on when it is detected that client 104 is receiving an advertisement. In this case, media player 106 cannot switch to requesting another version of the media program. This causes media player 106 to continue to request the current version of the media program being requested. This may affect the amount of video content stored in content buffer 202 as compared to if a lower bitrate version of the media program had been requested. For example, a smaller amount of video content for the higher bitrate version of the media program will be received than if the lower bitrate version was requested during the advertisement break. This may not adversely affect the playback of the media program, however. If not enough video content for the media program is stored in content buffer 202, the playback of the media program may be adversely affected (e.g., become jittery). During receiving the advertisements, the amount of video content for the media program received is usually less than the amount of video content for the media program received when no advertisements are being received. Although content buffer 202 receives less video content due to the version of the media program being fixed, the buffer length still grows while media player 106 plays an advertisement because media player 106 does not read any video content for the media program out of content buffer 202 during this time. Content buffer 202 may still have a sufficient amount of video content stored at the end of the advertisement break such that playback of the media program is not affected. As will be discussed below, MBR manager 108 may evaluate the conditions to determine whether playback will be affected or not by the disabling of the multiple bitrate algorithm. Thus, fixing the version of the media program that can be requested during an advertisement break may not affect the quality of the playback experience. Rather, the amount of content that is being stored in content buffer 202 is just affected.

MBR manager 108 may use various methods to disable and enable the MBR algorithm. The examples may involve analyzing the operation of the content buffer and the ad buffer, using the timing of the advertisement breaks, or analyzing when advertisements are being downloaded. For example, when MBR manager 108 detects that client 104 is not receiving any advertisements, MBR manager 108 may enable (re-enable) the MBR algorithm. In other embodiments, MBR manager 108 may detect when an advertisement break finishes and the media program begins playing again, and then enables the MBR algorithm. Also, MBR manager 108 may disable the MBR algorithm when media player 106 starts to play the advertisement. Further, if any pre-loading of advertisements occurs, MBR manager 108 may detect the pre-loading and disable the MBR algorithm. When MBR manager 108 detects that advertisements have finished downloading, MBR manager 108 may then enable the MBR algorithm. In this case, the advertisements may continue to play, but the downloading is finished and thus bandwidth for loading advertisements is not being used. In another example, MBR manager 108 may disable the MBR algorithm when content is paused or when any other event causes the MBR algorithm to switch to another bitrate inaccurately. Further, if MBR algorithm 108 determines playback of the media program may be adversely affected by the disabling, such as by determining the length of content buffer 202 is short (e.g., below a threshold, such as less than 3 seconds), MBR manager 108 may not disable the multiple bitrate algorithm and switch to a lower bitrate even if an advertisement is being received.

Figure 3A:
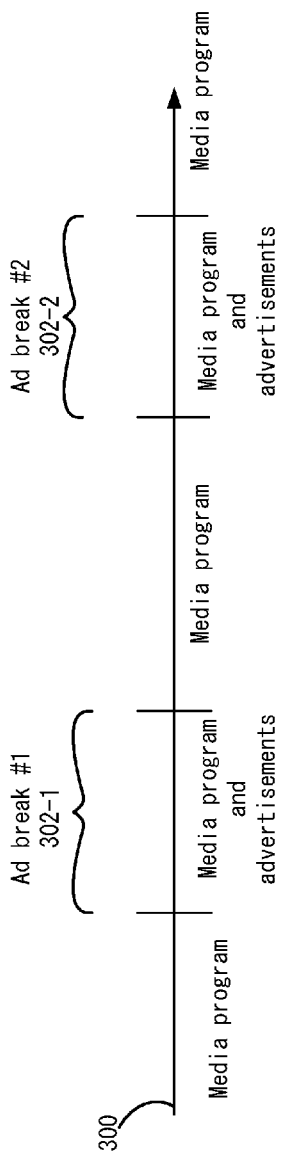
FIG. 3A depicts a timeline for delivering a media program and advertisements according to one embodiment.

FIG. 3A depicts a timeline 300 for delivering a media program and advertisements according to one embodiment. The media program may include advertisement breaks 302-1 and 302-2 where advertisements are played during the media program. It will be understood that the media program may have any number of advertisement breaks; however, an advertisement break #1 is shown at 302-1 and an advertisement break #2 is shown at 302-2. During the advertisement breaks, various advertisements may be received and played. That is, media player 106 may play the advertisements during the advertisement breaks.

Although the advertisement breaks are shown at certain times, server 102 may send the advertisements prior to the media program reaching the advertisement break. This may pre-load the advertisements, which stores the advertisements in advertisement buffer 204. As discussed above, when advertisements are received, the available bandwidth to send the video content for the media program to client 104 is reduced, and thus less video content for the media program is received if the bitrate of the media program being sent remains the same.

Figure 3B:
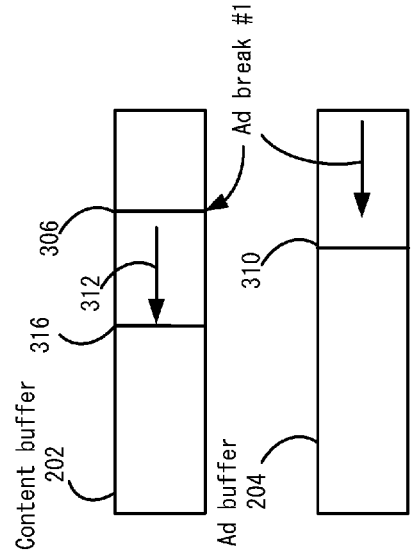
FIG. 3B shows a content buffer and an advertisement buffer when the multiple bitrate algorithm is not disabled according to one embodiment.

The following will now describe the effect on content buffer 202 when the multiple bitrate algorithm is not disabled and then disabled. FIG. 3B shows content buffer 202 and advertisement buffer 204 when the multiple bitrate algorithm is not disabled according to one embodiment. A point 306 shows an amount of video content for the media program in content buffer 202. This may be at the point when the pre-loading of advertisements starts or when the advertisement break starts. Also, the amount of advertisement content in advertisement buffer 204 may be very small or non-existent. However, the advertisement content in advertisement buffer 204 may increase as more advertisement content is received by client 104 and stored in advertisement buffer 204 as shown at 310. When MBR manager 108 detects the reduced amount of bandwidth available to receive the media program, MBR manager 108 reduces the bitrate of the media program version being requested. This increases the amount of video content received. At 312, the video content in content buffer 202 may increase when the advertisement break starts due to media player 106 not reading any video content out of content buffer 202. As shown, the amount of media program in content buffer 202 increases from a point shown at 306 to a point shown at 314. This point will be contrasted with a point described in FIG. 3C when the multiple bitrate algorithm is disabled.

Figure 3C:
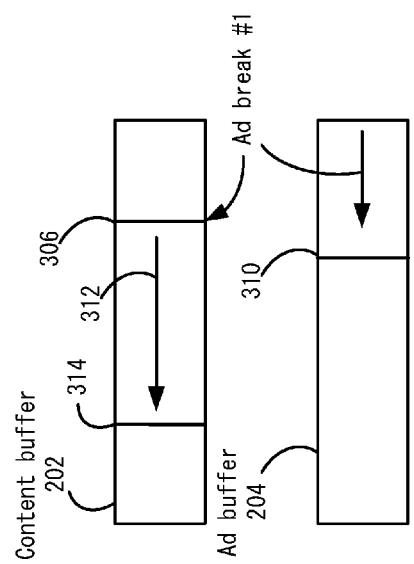
FIG. 3C shows an example of the content buffer and the advertisement buffer when the multiple bitrate algorithm is disabled according to one embodiment.

FIG. 3C shows an example of content buffer 202 and advertisement buffer 204 when the multiple bitrate algorithm is disabled according to one embodiment. The same points 306 and 310 are shown in content buffer 202 and advertisement buffer 204, respectively. That is, the same amount of advertisement content is stored in advertisement buffer 204. However, due to the disabling of the multiple bitrate algorithm, the bitrate of the media program version requested by media player 106 is not reduced while receiving the advertisements. Due to the higher bitrate of video content being requested and also the reduction of available bandwidth, media player 106 receives less video content for the media program than the situation described in FIG. 3B. As shown, the amount of video content stored in content buffer 202 is increased to a point 316 during the advertisement break. The point 316 shows that there is less video content stored in content buffer 202 than that stored in content buffer 202 as shown at point 314 in FIG. 3B. However, the quality of the video content for the media program stored in content buffer 202 in FIG. 3C is higher than the quality of the video content stored in content buffer 202 in FIG. 3B.

Figure 4:
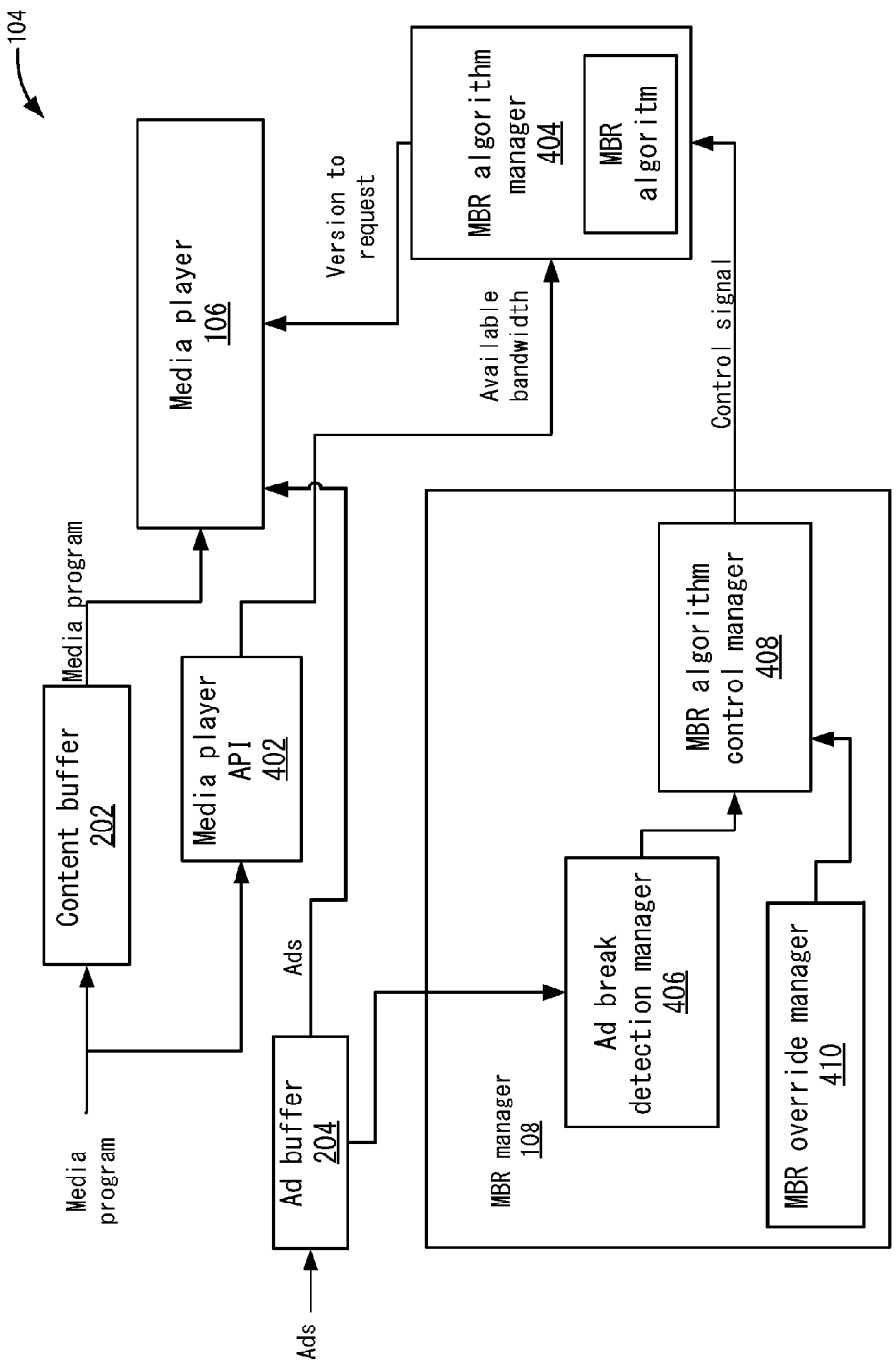
FIG. 4 shows a more detailed example of a client according to one embodiment.

FIG. 4 shows a more detailed example of client 104 according to one embodiment. As shown, content buffer 202 receives and stores video content for the media program. Also, a media player application programming interface (API) 402 determines the amount of video content received. Media player API 402 can then calculate the available bandwidth for the multiple bitrate algorithm. For example, media player API 402 may determine the available bandwidth based on the amount of video content received by client 104 over a period of time. Media player API 402 inputs the available bandwidth to MBR algorithm manager 404, which calculates the version of the media program to request based on the available bandwidth using an MBR algorithm. MBR algorithm manager 404 may output which version to request to media player 106. In one embodiment, MBR algorithm manager 404 may be restricted to using media player API 402 to determine the available bandwidth. This limits the ability of MBR algorithm manager 404 to compensate for when the available bandwidth might be misrepresented when advertisements are received.

Within MBR manager 108, an advertisement break detection manager 406 may detect when advertisement content is received by client 104 for display on media player 106. Advertisement break detection manager 406 may detect the receiving of advertisements in various ways. For example, advertisement break detection manager 406 may monitor advertisement buffer 204. When advertisements are stored in advertisement buffer 204, advertisement break detection manager 406 may detect this. In one embodiment, advertisement break detection manager 406 may check the length of advertisement buffer 204 and if it is longer than certain threshold, advertisement break detection manager 406 determines that advertisements are stored in advertisement buffer 204. Also, advertisement break detection manager 406 may use an API function to get the states of advertisement break detection manager 406 to determine when advertisements are being downloaded.

Ad break detection manager 406 may also detect when an advertisement break occurs in the playing of the media program. For example, advertisement break detection manager 406 may detect when media player 106 retrieves advertisement content from advertisement buffer 204. In another embodiment, when a media program is loaded and initialized, advertisement break detection manager 406 may also load the time information of all of the ad breaks. Also, in another embodiment, a server may send an ad break start signal to the media player and the media player can determine the ad break starts by detecting this signal.

An MBR algorithm control manager 408 receives indications from advertisement break detection manager 406 indicating whether advertisements are being received by client 104. MBR algorithm control manager 408 may then determine whether to disable MBR algorithm manager 404 based on the indications. Some scenarios when MBR algorithm control manager 408 disables the MBR algorithm will be discussed below. When MBR algorithm control manager 408 determines that the MBR algorithm should be disabled, MBR algorithm control manager 408 sends a control signal to MBR algorithm manager 404 to disable the MBR algorithm. In this case, MBR algorithm manager 404 disables the MBR algorithm and does not allow media player 106 to switch to requesting another bitrate version for the media program. MBR algorithm manager 404 may not perform any new calculations for the MBR algorithm while being disabled. In this case, media player 106 continues to request the same version of the media program until receiving a new signal from MBR algorithm manager 404 to request a new version.

When MBR algorithm control manager 408 receives an indication from advertisement break detection manager 406 that the advertisements have finished downloading, MBR algorithm control manager 408 may enable MBR algorithm manager 404. In this case, MBR algorithm manager 404 may resume calculating whether to switch to another version of the media program based on available bandwidth readings from media player API 402. MBR algorithm manager 404 may calculate whether to switch versions using different methods after being re-enabled. For example, available bandwidth readings from the point when MBR algorithm manager 404 is re-enabled are used and available bandwidth readings when MBR algorithm manager 404 was disabled may not be used. This eliminates the possibility of using inaccurate available bandwidth readings when advertisements are being received. In other examples, MBR algorithm manager 404 may weight the available bandwidth values received while the advertisements are playing differently than available bandwidth values received when advertisements are not playing to account for the inaccuracy.

At some points, it may not be desirable to disable the multiple bitrate algorithm even when advertisements are being loaded. That is, maybe it is better to switch to a different version of the media program while an advertisement is being loaded. An MBR override manager 410 may monitor various conditions to determine if the disabling of the multiple bitrate algorithm should be overridden. For example, MBR override manager 410 may detect the length of content buffer 202 to determine the amount of video content for the media program currently being stored in content buffer 202. If the buffer length is below a threshold, such as <3 seconds of playing time, then MBR override manager 410 may determine that the multiple bitrate algorithm should not be disabled. In this case, MBR algorithm manager 404 may allow the MBR algorithm to be evaluated using the available bandwidth readings received from media player API 402. Thus, it may be determined that media player 106 should request a version of the media program at a lower bandwidth. For example, some override considerations include if the advertisements are at the very beginning of the media program or if the bitrate that being received for the media program is the lowest possible bitrate.

Figure 5:
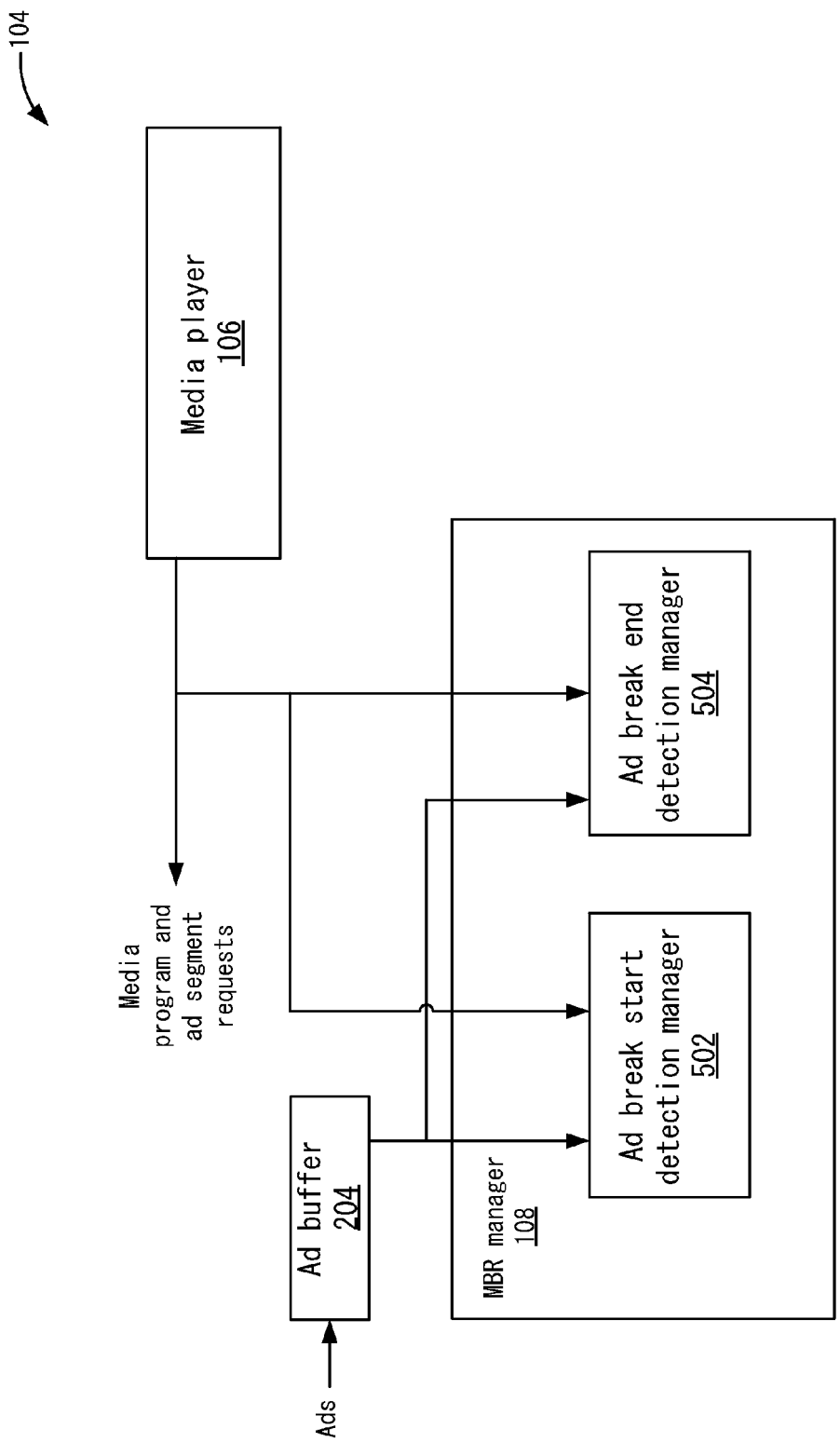
FIG. 5 depicts different examples for detecting when to disable the multiple bitrate algorithm in an MBR manager according to one embodiment.

As discussed above, particular embodiments may use different ways to detect when to disable the multiple bitrate algorithm. FIG. 5 depicts different examples for detecting when to disable the multiple bitrate algorithm in MBR manager 108 according to one embodiment. Advertisement break detection manager 406 includes an advertisement break start detection manager 502 and an advertisement break end detection manager 504. In a first embodiment, advertisement break start detection manager 502 and advertisement break end detection manager 504 may insert themselves into signaling streams to determine when an advertisement starts loading and is finished. For example, advertisement break start detection manager 502 may intercept segment requests from media player 106. In this case, advertisement break start detection manager 502 may detect when media player segments or advertisement segments are being requested. This can allow advertisement break start detection manager 502 to determine when an advertisement is being loaded. To determine the advertisement break end, ad break end detection manager 504 may also intercept the media program segment and advertisement segment requests. When advertisement break end detection manager 504 detects that an advertisement segment is not being requested by media player 106, advertisement break end detection manager 504 may determine that advertisements are not being loaded by client 104. For example, every time media player 106 sends a request, advertisement break start detection manager 502 receives a copy of the request, and checks the header of the request to determine whether it is a content request or an ad request. In another embodiment, server 102 may send an ad request start signal to media player 106 and advertisement break start detection manager 502 can determine the ad request starts by detecting this signal. In another embodiment, media player 106 sends out signals such as "ad request start" and "ad request end", and advertisement break start detection manager 502 can detect these signals to determine the start and end of ad request.

In another embodiment, advertisement break start detection manager 502 may monitor advertisement buffer 204 to determine when content is being actively stored in advertisement buffer 204. Also, advertisement break end detection manager 504 may monitor advertisement buffer 204 to determine when advertisements are not being stored in advertisement buffer 204.

Figure 6:
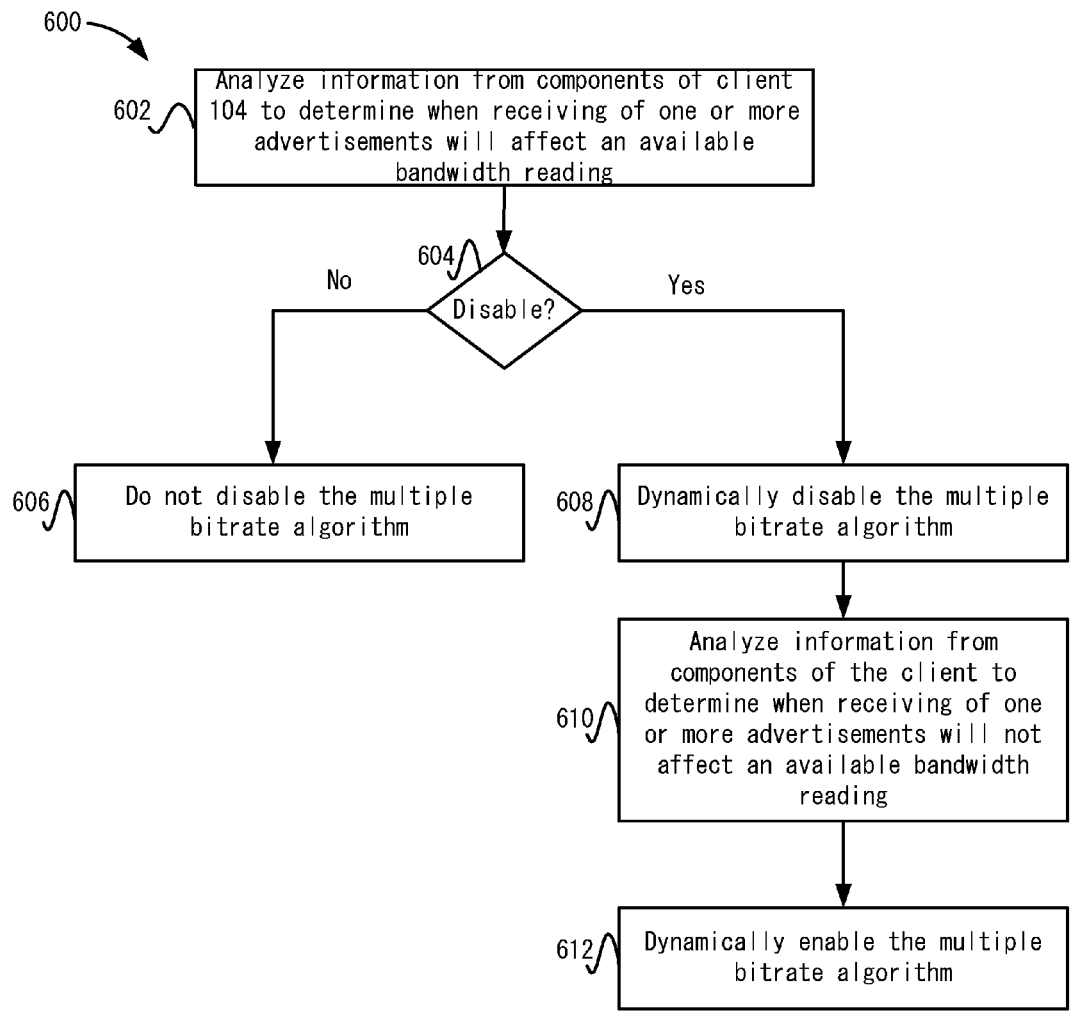
FIG. 6 depicts a simplified flowchart of a method for performing the enabling and disabling of the multiple bitrate algorithm according to one embodiment.

FIG. 6 depicts a simplified flowchart of a method for performing the enabling and disabling of the multiple bitrate algorithm according to one embodiment. At 602, MBR manager 108 analyzes information from components of client 104 to determine when receiving of one or more advertisements will affect an available bandwidth reading that is based on receiving of a media program. Any of the methods above may be used to detect when advertisements may be loaded in conjunction with the media program. Thus, the components may include ad buffer 204, content buffer 202, media player 106, or other components from client 104.

At 604, MBR manager 108 determines whether to disable the multiple bitrate algorithm. For example, MBR manager 108 may analyze the current conditions for playback of the media program, such as the content buffer length. If MBR manager 108 determines the current conditions are such that disabling the multiple bitrate algorithm will affect playback of the media program, then at 606, MBR manager 108 determines the multiple bitrate algorithm cannot be disabled.

If MBR manager 108 determines the current conditions are adequate such that disabling the multiple bitrate algorithm will not affect playback of the media program, then at 608, MBR manager 108 dynamically disables the multiple bitrate algorithm. In this case, a new bitrate version of the media program cannot be requested by media player 106.

At 610, MBR manager 108 analyzes information from components of client 104 to determine when receiving of one or more advertisements will not affect an available bandwidth reading that is based on receiving of a media program. When this point occurs, at 612, MBR manager 108 dynamically enables the multiple bitrate algorithm.

System Overview

Figure 7:
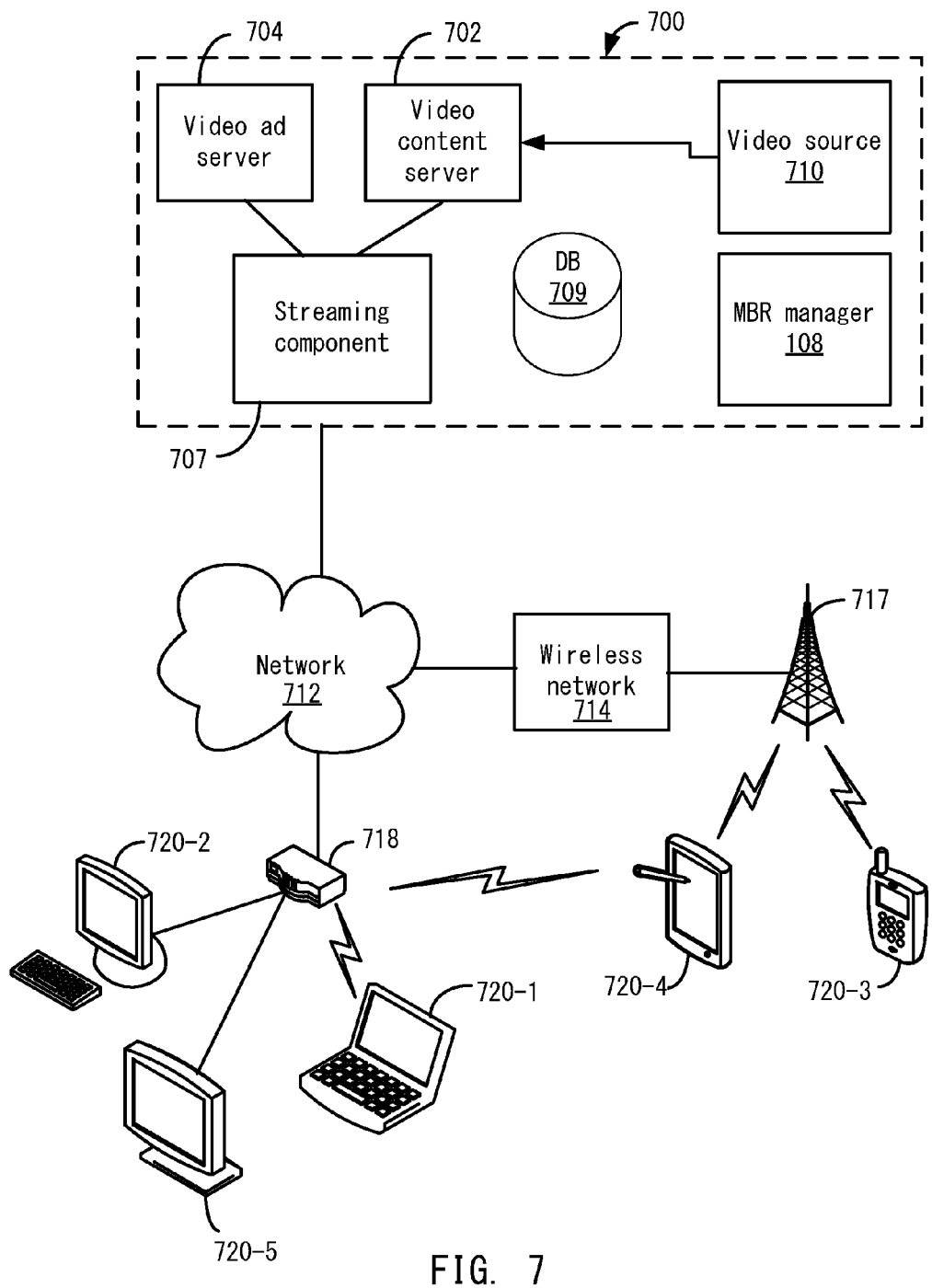
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 700, a public service message, or some other information. The video advertising server 704 may serve the video advertising segments as directed by a user interface controller (not shown).

The video streaming system 700 also may include MBR manager 108. In this case, MBR manager 108 may receive version requests from client 104 and respond with segments of the version of the media program requested.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712 and/or other network 714. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless telephony network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HTTP and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
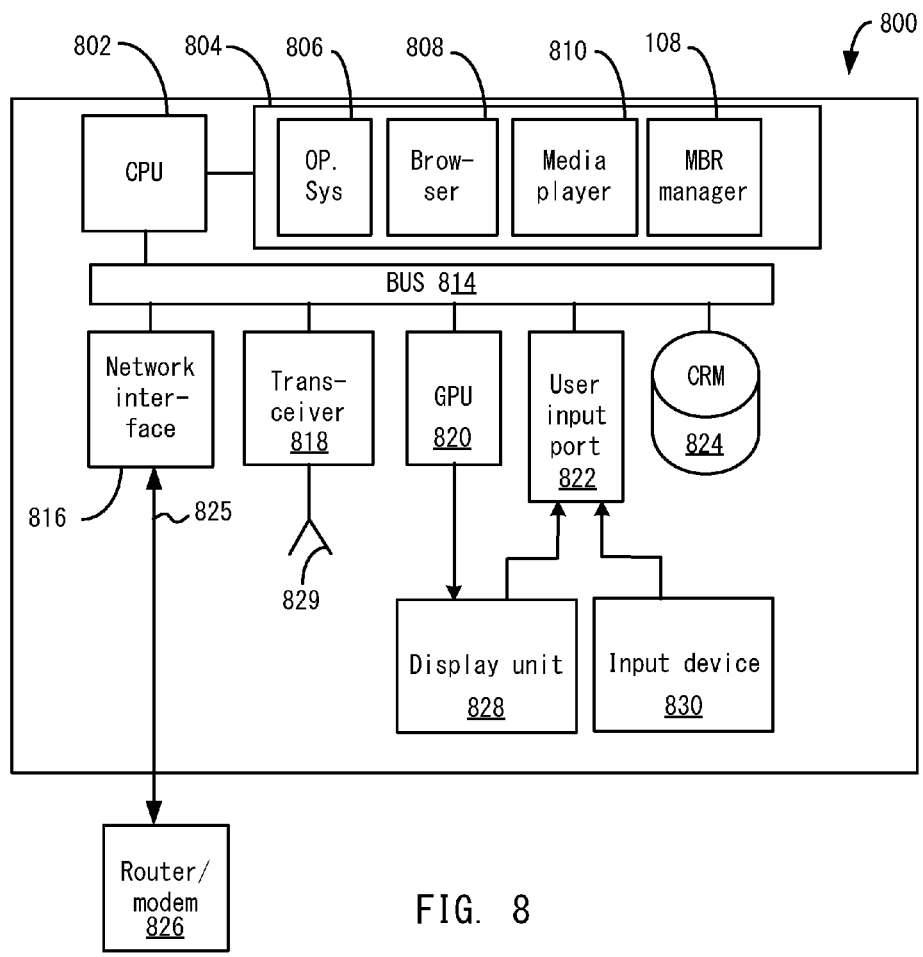
FIG. 8 depicts a diagrammatic view of an apparatus for viewing media program and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The modules may further include MBR manager 108. MBR manager 108 determines when to disable and enable the multiple bitrate algorithm. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    determining first information from a set of components of a computing device to determine when receiving of one or more advertisements for an advertisement break will affect an available bandwidth reading that is based on receiving of a media program;
    disabling a multiple bitrate algorithm by changing from an enabled state to a disabled state based upon the first information such that a new bitrate version of the media program cannot be requested by the multiple bitrate algorithm for a media player;
    determining second information from the set of components of the computing device to determine when the available bandwidth reading will not be affected by receiving of the one or more advertisements for the advertisement break of the media program; and
    enabling the multiple bitrate algorithm from the disabled state to an enabled state based on the second information, wherein the multiple bitrate algorithm is allowed to request the different bitrate version of the media program based on the available bandwidth reading when in the enabled state.

2. The method of claim 1, further comprising:
    determining when the one or more advertisements are being received by the computing device by analyzing the first information, wherein the disabling the multiple bitrate algorithm is performed when the one or more advertisements are being received by the computing device.

3. The method of claim 2, wherein determining when the one or more advertisements are being received comprises analyzing an advertisement buffer configured to buffer the one or more advertisements to determine when the one or more advertisements are being buffered.

4. The method of claim 2, wherein determining when the one or more advertisements are being received comprises determining when an advertisement break starts in the media program.

5. The method of claim 2, wherein determining when the one or more advertisements are being received comprises intercepting signaling from the media player to request a portion of the one or more advertisements.

6. The method of claim 1, further comprising:
    determining when the one or more advertisements are not being received for the advertisement break by analyzing the second information.

7. The method of claim 6, wherein determining when the one or more advertisements are not being received comprises analyzing an advertisement buffer configured to buffer the one or more advertisements to determine when the one or more advertisements are not being buffered.

8. The method of claim 6, wherein determining when the one or more advertisements are not being received comprises determining when an advertisement break ends in the media program.

9. The method of claim 6, wherein determining when the one or more advertisements are not being received comprises determining when the media player is not requesting a portion of the one or more advertisements by intercepting signaling from the media player.

10. The method of claim 1, further comprising:
    determining status information for the media player;
    determining a condition in which the disabling of the multiple bitrate algorithm should be overridden based on the status information; and
    not performing the disabling of the multiple bitrate algorithm when the condition is determined.

11. The method of claim 10, wherein:
the status comprises a length of a content buffer including the media program, and
the condition comprises the length being below a threshold.

12. The method of claim 1, wherein upon enabling the multiple bitrate algorithm, the method further comprising:
calculating whether to switch to the different bitrate version of the media program based on available bandwidth readings, wherein available bandwidth readings determined while the multiple bitrate algorithm was disabled are not used.

13. The method of claim 1, wherein the set of components comprises an ad buffer or the media player.

14. A non-transitory computer-readable storage medium containing instructions, that when executed, control a computer system to be configured for:
determining first information from a set of components of the computer system to determine when receiving of one or more advertisements for an advertisement break will affect an available bandwidth reading that is based on receiving of a media program;
disabling a multiple bitrate algorithm by changing from an enabled state to a disabled state based upon the first information such that a new bitrate version of the media program cannot be requested by the multiple bitrate algorithm for a media player;
determining second information from the set of components of the computing device to determine when the available bandwidth reading will not be affected by receiving of the one or more advertisements for the advertisement break of the media program; and
enabling the multiple bitrate algorithm from the disabled state to an enabled state based on the second information, wherein the multiple bitrate algorithm is allowed to request the different bitrate version of the media program based on the available bandwidth reading when in the enabled state.

15. The non-transitory computer-readable storage medium of claim 14, further comprising:
determining when the one or more advertisements are being received by the computing device by analyzing the first information, wherein the disabling the multiple bitrate algorithm is performed when the one or more advertisements are being received by the computing device.

16. The non-transitory computer-readable storage medium of claim 14, further comprising:
determining when the one or more advertisements are not being received for the advertisement break by analyzing the second information.

17. The non-transitory computer-readable storage medium of claim 14, further configured for:
determining status information for the media player;
determining a condition in which the disabling of the multiple bitrate algorithm should be overridden based on the status information; and
not performing the disabling of the multiple bitrate algorithm when the condition is determined.

18. The non-transitory computer-readable storage medium of claim 14, wherein upon enabling the multiple bitrate algorithm, the method further comprising: calculating whether to switch to the different bitrate version of the media program based on available bandwidth readings, wherein available bandwidth readings determined while the multiple bitrate algorithm was disabled are not used.

19. The non-transitory computer-readable storage medium of claim 14, wherein the set of components comprises an ad buffer or the media player.

20. An apparatus comprising:
one or more computer processors; and
a non-transitory computer-readable storage medium comprising instructions, that when executed, control the one or more computer processors to be configured for:
determining first information from a set of components of the apparatus to determine when receiving of one or more advertisements for an advertisement break will affect an available bandwidth reading that is based on receiving of a media program;
disabling a multiple bitrate algorithm by changing from an enabled state to a disabled state based upon the first information such that a new bitrate version of the media program cannot be requested by the multiple bitrate algorithm for a media player;
determining second information from the set of components of the computing device to determine when the available bandwidth reading will not be affected by receiving of the one or more advertisements for the advertisement break of the media program; and
enabling the multiple bitrate algorithm from the disabled state to an enabled state based on the second information, wherein the multiple bitrate algorithm is allowed to request the different bitrate version of the media program based on the available bandwidth reading when in the enabled state.

* * * * *